Oct. 14, 1930.     J. C. CONNOR     1,778,419
METHOD OF MOLDING
Filed May 5, 1928
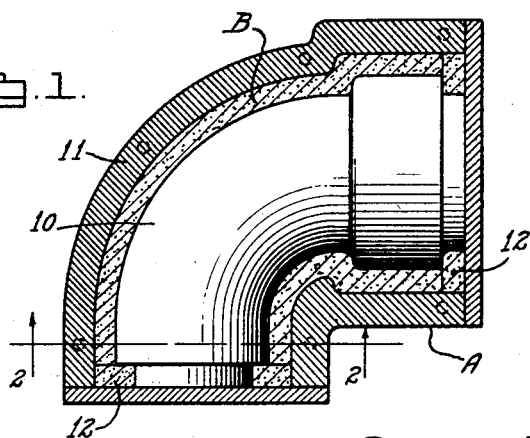
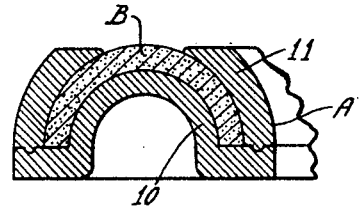
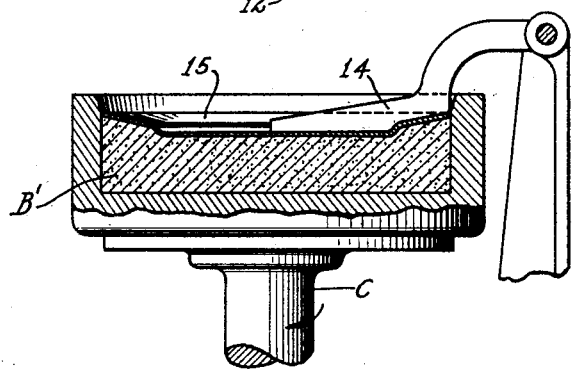
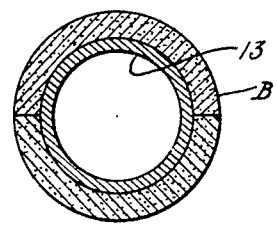
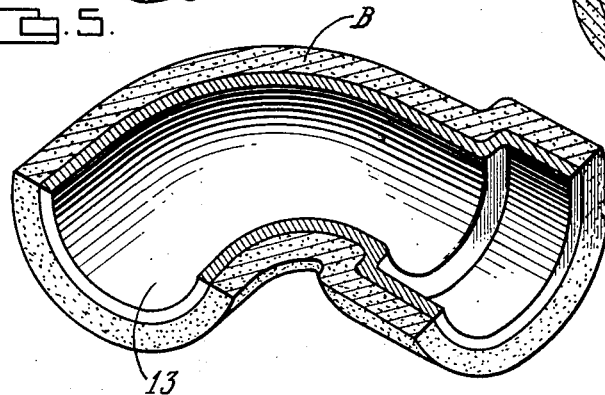
INVENTOR.
John C. Connor
BY
ATTORNEY.

Patented Oct. 14, 1930

1,778,419

UNITED STATES PATENT OFFICE

JOHN C. CONNOR, OF TORONTO, OHIO

METHOD OF MOLDING

Application filed May 5, 1928. Serial No. 275,293.

This invention relates to molding devices and methods of molding and refers more particularly to improvements in the art of clay working, such as the manufacture of pottery dishes, and the like from pottery clay and sewer pipes and other articles from fire clay. In its broad aspect my invention is applicable to the broad field of clay working and the above will serve as illustrative of some of the more important applications of my invention.

At the present time it is customary to prepare the usual plaster of Paris molds for molding the clay articles by casting the molds in a master mold commonly termed a block and case. A wood profile is used to fashion the block and case, the latter being formed also of plaster of Paris. With such molding devices it is necessary to maintain a certain degree of moisture in the block and case and it is also necessary to coat the block and case with linseed oil or other suitable material to prevent the molds from adhering to the block and case. A more troublesome disadvantage in the customary practice arises from the wearing and breakage of the plaster of Paris block and case. As the block and case is used for casting the molds, the block and case becomes worn more and more, resulting in a corresponding increase in the dimensions of the molds cast therefrom. This results in nonuniformity of molds and non-uniformity in the clay articles fashioned from the molds; also within a comparatively short time the molding surfaces of the plaster block and case become so worn that it must be scrapped.

One object of my invention resides in the provision of a block and case which will avoid the aforesaid difficulties and objections. By reason of my invention I am enabled to provide a block and case or master mold of a permanent character, capable of being used repeatedly in forming the usual plaster molds without wearing. Thus uniformity of molds and articles molded therefrom is assured. Furthermore, my invention eliminates the necessity for maintaining moisture in the block and case and I am also enabled to dispense with the aforesaid linseed oil or other coating. A still further advantage in my master mold resides in the fact that less skill is required in making the plaster molds therefrom, owing to the uniformity of the master mold. Thus allowances for variation in size owing to wear of the heretofore customary plaster master mold is no longer a factor.

Referring to the accompanying drawings which will illustrate several embodiments of my invention.

Fig. 1 is a plan view partly in section illustrating my improved molding device as applied to the fire clay industry, Fig. 2 is a sectional elevation view along 2—2 of Fig. 1, Fig. 3 is a perspective view illustrating a clay pipe section formed from the plaster mold illustrated in Fig. 1, Fig. 4 is a sectional view through the complete clay pipe as molded by my device, and Fig. 5 is an elevation view partly in section illustrating my invention as adapted to the pottery clay industry.

In the drawings reference character A represents my master mold or block and case, the illustration being adapted for molding a clay pipe section. The master mold A in accordance with my invention in constructed preferably of aluminum such as used in ordinary household utensils. I have discovered that a block and case constructed of aluminum will fulfill the aforesaid objects of my invention. As far as I am aware I am the first in this field to teach the use of any material providing a master mold of a permanent character, as distinguished from the usual plaster construction, and I consider the scope of my invention as being correspondingly broad.

The master mold A may be formed generally similarly to the heretofore customary plaster mold, such as in sections 10, 11, the plaster of Paris being poured into the space between these sections to form the mold proper B. If desired spaces at the ends of the master mold may be filled with clay 12 confining the plaster to the desired portions of the master mold. The aluminum master mold A may be made in any desired manner as by casting the same from a pattern as will be readily understood. In the fire clay art it is customary to form the plaster pipe mold in halves which are individually filled by hand with a layer of clay 13. The halves are then registered as in Fig. 4 and after setting the halves are removed leaving the complete pipe section or other article to dry.

In Fig. 5 I have shown my invention as applied to the pottery clay industry. C is the usual rotary jigger carrying a plaster mold B' corresponding to the plaster mold B of Figs. 1-4. A piece of pottery clay is placed on the molding surface of mold B', the forming arm 14 cooperating with the mold B' to shape the plate 15 or other article produced from the pottery clay. By molding the molds B' from a master mold of the same material as described in connection with the master mold B all of the aforesaid advantages will be obtained in the pottery clay industry.

By reason of my invention and in addition to the aforesaid advantages I am enabled to effect a large saving in the initial cost of manufacture of the plaster molds from the master mold. The plaster sets much faster in my aluminum master mold than in the heretofore customary corresponding plaster mold and enabling the master mold to be withdrawn much sooner after the pouring of the plaster.

What I claim as my invention is:

1. The method of forming articles of clay, consisting in employing a master mold of aluminum, fashioning plaster molds from said master mold, and finally forming the clay articles from said plaster molds.

2. The method of forming clay articles, consisting in utilizing a block and case of a material having the characteristics of aluminum, fashioning plaster molds from said master mold, and forming the clay articles from said plaster molds.

In witness whereof, I hereunto subscribe my name this 31st day of March, A. D. 1928.

JOHN C. CONNOR.